(12) United States Patent
Hong et al.

(10) Patent No.: US 10,518,253 B2
(45) Date of Patent: *Dec. 31, 2019

(54) CATALYST AND METHOD FOR PREPARING CATALYST

(71) Applicants: HYUNDAI MOTOR COMPANY, Seoul (KR); KIA MOTORS CORPORATION, Seoul (KR); POSTECH ACADEMY-INDUSTRY FOUNDATION, Pohang-si, Gyeongsangbuk-do (KR)

(72) Inventors: Suk Bong Hong, Pohang-si (KR); Donghui Jo, Gongju-si (KR); Taekyung Ryu, Daejeon (KR); Gi Tae Park, Daegu (KR); In-Sik Nam, Pohang-si (KR); Pyung Soon Kim, Suwon-si (KR); Chang Hwan Kim, Seongnam-si (KR)

(73) Assignees: HYUNDAI MOTOR COMPANY, Seoul (KR); KIA MOTORS CORPORATION, Seoul (KR); POSTECH ACADEMY-INDUSTRY FOUNDATION, Pohang-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,850

(22) Filed: Feb. 10, 2017

(65) Prior Publication Data
US 2017/0232428 A1 Aug. 17, 2017

(30) Foreign Application Priority Data

Feb. 12, 2016 (KR) .................. 10-2016-0016512
Dec. 7, 2016 (KR) .................. 10-2016-0165932

(51) Int. Cl.
| | |
|---|---|
| *B01J 29/06* | (2006.01) |
| *B01J 29/76* | (2006.01) |
| *B01D 53/94* | (2006.01) |
| *B01J 37/02* | (2006.01) |
| *C01B 39/14* | (2006.01) |
| *C01B 39/02* | (2006.01) |
| *B01J 29/80* | (2006.01) |
| *B01J 29/072* | (2006.01) |
| *B01J 35/00* | (2006.01) |
| *B01J 35/04* | (2006.01) |
| *B01J 37/04* | (2006.01) |
| *B01J 37/08* | (2006.01) |
| *B01J 37/30* | (2006.01) |
| *F01N 3/20* | (2006.01) |

(52) U.S. Cl.
CPC ...... *B01J 29/7607* (2013.01); *B01D 53/9413* (2013.01); *B01D 53/9418* (2013.01); *B01J 29/072* (2013.01); *B01J 29/763* (2013.01); *B01J 29/80* (2013.01); *B01J 35/0006* (2013.01); *B01J 35/04* (2013.01); *B01J 37/0201* (2013.01); *B01J 37/0246* (2013.01); *B01J 37/04* (2013.01); *B01J 37/08* (2013.01); *B01J 37/30* (2013.01); *C01B 39/026* (2013.01); *C01B 39/14* (2013.01); *C01B 39/145* (2013.01); *F01N 3/2066* (2013.01); B01D 2255/2092 (2013.01); B01D 2255/20761 (2013.01); B01D 2255/30 (2013.01); B01D 2255/50 (2013.01); B01D 2255/915 (2013.01); B01J 2229/183 (2013.01); B01J 2229/186 (2013.01); B01J 2229/34 (2013.01); B01J 2229/36 (2013.01); F01N 2370/04 (2013.01); F01N 2570/14 (2013.01)

(58) Field of Classification Search
CPC ...... B01J 29/763; B01J 29/7607; B01J 29/80; B01J 2229/186; B01J 2229/183; B01J 2229/36; B01J 37/0246; B01J 37/30; B01J 37/04; B01J 37/0201; B01J 35/04; B01J 35/0006; C01B 39/14; C01B 39/145; C01B 39/026; B01D 53/9413; B01D 53/9418; B01D 2255/50; B01D 2255/30
USPC ............. 502/63, 64, 66, 67, 69, 74; 423/700
See application file for complete search history.

(56) References Cited

U.S. PATENT DOCUMENTS

| | | | |
|---|---|---|---|
| 3,314,752 A | 4/1967 | Zeolite et al. | |
| 8,329,127 B2 * | 12/2012 | Cox ................... | B01D 53/9468 423/213.2 |
| 2005/0031535 A1 * | 2/2005 | Mueller ................. | C01B 37/00 423/716 |
| 2006/0269620 A1 * | 11/2006 | Morris .................... | A61K 8/19 424/684 |

(Continued)

FOREIGN PATENT DOCUMENTS

| | | |
|---|---|---|
| EP | 2123354 A1 | 11/2009 |
| EP | 2965813 A1 | 1/2016 |
| WO | 00/72965 A1 | 12/2000 |

OTHER PUBLICATIONS

Metkar et al., "Selective catalytic reduction of NOx on combined Fe- and Cu-zeolite monolithic catalysts: Sequential and dual layer configurations", Applied Catalysis B: Environmental, 111-112, 2012, pp. 67-80.*

(Continued)

Primary Examiner — Elizabeth D Wood
(74) Attorney, Agent, or Firm — Morgan, Lewis & Bockius LLP

(57) ABSTRACT

A catalyst includes LTA zeolite including copper ions, wherein a Si/Al ratio of the LTA zeolite is 2 to 50. The catalyst is coated on a honeycomb carrier or a filter. The catalyst removes NOx from a reaction gas at 100° C. or above. The catalyst has an NOx conversion rate of 80% at 450° C. or above.

5 Claims, 23 Drawing Sheets

(56) References Cited

U.S. PATENT DOCUMENTS

| | | | | |
|---|---|---|---|---|
| 2010/0055386 | A1* | 3/2010 | Ohno | B01J 29/06 |
| | | | | 428/116 |
| 2010/0331968 | A1* | 12/2010 | Morris | A61K 8/19 |
| | | | | 623/1.42 |
| 2011/0300042 | A1* | 12/2011 | Bull | B01D 53/9418 |
| | | | | 502/100 |
| 2013/0089494 | A1 | 4/2013 | Reichinger et al. | |
| 2013/0195731 | A1* | 8/2013 | Bull | B01D 53/9418 |
| | | | | 422/171 |
| 2014/0154175 | A1 | 6/2014 | Li et al. | |
| 2014/0170045 | A1* | 6/2014 | Fedeyko | B01J 29/74 |
| | | | | 423/237 |
| 2015/0004094 | A1* | 1/2015 | Schmidt | B01J 29/85 |
| | | | | 423/704 |

OTHER PUBLICATIONS

H. Robson, ed., Verified Syntheses of Zeolitic Materials, (2001) Elsevier.

U.S. Office Action issued in U.S. Appl. No. 15/368,066 dated Mar. 22, 2018, 8 pages.

D. Jo, et al., "Synthesis of High-Silica LTA and UFI Zeolites and NH3-SCR Performance of Their Cooper-Exchanged Form," ACS Catalysis, vol. 6, 2016, pp. 2443-2447.

U.S. Office Action issued in U.S. Appl. No. 15/368,066 dated Mar. 22, 2018.

Feng Bin et al: "Selective catalytic reduction of nitric oxide with ammonia over zirconium-doped copper/ZSM-5 catalysts", Applied Catalysis 8: Environmental, vol. 150-151, No. 151, May 2014 (May 1, 2014), pp. 532-543, XP055382748, Amsterdam, NL ISSN: 0926-3373, DOI: 10.1016/j.apcatb. 2013.12.052.

Badran A H et al: "Studies on the surface area of Fe(III) and Cu(II) ion exchanged zeolites of type A and X using sorption and x-ray powder diffraction", Inorganica Chimica ACTA, Elsevier BV, NL, vol. 21, Jan. 1, 1977 (Jan. 1, 1977), pp. 233-238, XP026671593, ISSN: 0020-1693, DOI: 10.1016/S0020-1693(00)86267-2 [retrieved on Jan. 1, 1977].

Ben W. Boal et al: "Facile Synthesis and Catalysis of Pure-Silica and Heteroatom LTA", Chemistry of Materials, vol. 27, No. 22, Nov. 24, 2015 (Nov. 24, 2015), pp. 7774-7779, XP055381605, US ISSN: 0897-4756, DOI: 10.1021/acs.chemater.5b03579.

Han Sik Lee et al: "Redox reactions of copper in zeolite A. Four crystal structures of vacuum-desolvated copper-exchanged zeolite A, Cu8-A", Journal of Physical Chemistry, vol. 85, No. 4, Feb. 1, 1981 (Feb. 1, 1981), pp. 397-405, XP055381588, US ISSN: 0022-3654, DOI: 10.1021/j150604a018.

Michael W Anderson et al: "Electron Spin Echo Study of Cu2+-Doped Zeolite K-ZK4: Cation Location and Adsorbate Interaction", J. Phys. Chem., Jan. 1, 1986 (Jan. 1, 1986), pp. 3206-3212, XP055379416, Retrieved from the Internet: URL:http://pubs.acs.org/doi/pdf/10.1021/j100405a032.

Maggie Zamadics et al: "Effect of divalent cations on the location and coordination of Cu(II) ions in SAPO-42 molecular sieve", Journal of Physical Chemistry, vol. 97, No. 13, Apr. 1, 1993 (Apr. 1, 1993), pp. 3359-3364, XP055381581, US ISSN: 0022-3654, DOI: 10.1021/11001 15a045.

Extended European Search Report issued in Application No. 17151392.2 dated Jul. 5, 2017.

Extended European Search Report issued in Application No. 171516633.9 dated Jul. 5, 2017.

U.S. Office Action issued in U.S. Appl. No. 15/368,066 dated Nov. 5, 2018.

\* cited by examiner

CATALYST AND METHOD FOR PREPARING CATALYST

CROSS-REFERENCE TO RELATED APPLICATION

This application claims the benefit of priority to Korean Patent Application Nos. 10-2016-0016512 and 10-2016-0165932 filed in the Korean Intellectual Property Office on Feb. 12, 2016 and Dec. 7, 2016, the entire contents of which are incorporated herein by reference.

TECHNICAL FIELD

The present disclosure relates to a method for manufacturing a zeolite catalyst. More particularly, the present disclosure relates to a method for manufacturing a zeolite catalyst of which high-temperature performance can be improved.

BACKGROUND

In general, carbon monoxide, hydrocarbons, and nitrogen oxides are included as harmful materials in exhaust gas of diesel vehicles. Nitrogen oxides cause environmental problems such as photochemical smog and acid rain, as well as human diseases. Therefore, there is a demand for improving engines and developing a post-treatment technology of exhaust gas.

The most effective technology for removing nitrogen oxides uses a selective catalytic reduction (SCR) method. This method has been developed according to a reducing agent such as ammonia (NH3), urea, hydrocarbon (HC), and the like, and various catalysts. Ammonia ($NH_3$) has been known to be effective in removing nitrogen oxides from a fixed object such as a power plant and an incinerator. Since there is a problem of storage/transport and use of ammonia, in case of a moving object such as a vehicle, urea has been known to be effective as it is capable of being easily decomposed to ammonia by heat decomposition and a hydration reaction.

As the catalyst for use in the selective catalyst reduction method, zeolite-based catalysts such as copper (Cu)/zeolite having excellent functions has been developed.

In particular, high temperature activity of such a catalyst is important in treatment of high-temperature exhaust gas.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method for manufacturing a zeolite catalyst of which high-temperature performance can be improved.

A catalyst according to an exemplary embodiment of the present disclosure includes linde type A (LTA) zeolite including copper ions, wherein an Si/Al ratio of the LTA zeolite is 2 to 50.

The catalyst may be coated on a honeycomb carrier or a filter.

The catalyst may remove NOx from a reaction gas at 100° C. or above.

The catalyst may have an NOx conversion rate of 80% at 450° C. or above.

A content of copper in the catalyst may be 1 wt % to 5 wt %.

The catalyst may further include an additive.

The additive may be an alkali metal or an alkali earth metal, and a ratio of the additive and aluminum may be 0.1 to 0.3.

The additive may be selected from a group consisting of La, Ce, Zr, Sc, and In, and the ratio of the additive and aluminum may be 0.01 to 0.05.

The catalyst may further include a copper type of SSZ-13 zeolite.

A mixing ratio of the LTA zeolite and the copper-type SSZ-13 zeolite may be 1:3 to 3:1.

According to another exemplary embodiment, a catalyst includes LTA zeolite that contains Fe ions, wherein an Si/Al ratio of the LTA zeolite is 2 to 50.

The catalyst may be coated on a honeycomb carrier or a filter.

The catalyst may remove NOx from a reaction gas at 100° C. or above.

A content of iron in the catalyst may be 1 wt % to 5 wt %.

Accordig to another exemplary embodiment of the present disclosure, a method for manufacturing a catalyst includes: preparing a LTA zeolite of which a Si/Al ratio is 2 or more; preparing s LTA zeolite containing ions by using the LTA zeolite; and preparing a copper-type of LTA zeolite by performing copper ion exchange on the ion-containing LTA zeolite.

A Si/Al ratio of the LTA zeolite may be 2 to 50.

The preparing of the ion-containing LTA zeolite may include substituting ions in the LTA zeolite.

The preparing of the ion-containing LTA zeolite may include adding the LTA zeolite to an ammonium salt for reaction and then drying the LTA zeolite, wherein the ammonium salt may be ammonium nitrate ($NH_4NO_3$).

The performing of copper ion exchanging on the ion-containing LTA zeolite may include adding the ion-containing LTA zeolite to a copper precursor solution and stirring the solution.

The method for manufacturing the catalyst may further include thermally treating the copper type of LTA zeolite after the preparing of the copper-type LTA zeolite, wherein the thermal treatment may be performed at a temperature ranging from 1 to 30° C./min from 400 to 750° C.

The preparing of the LTA zeolite having the Si/Al ratio of 2 or more may include preparing the LTA zeolite using an LTA seed or not using an LTA seed.

According to another exemplary embodiment of the present disclosure, a method for manufacturing a catalyst includes: preparing an LTA zeolite of which a Si/Al ratio is 2 or more; preparing an LTA zeolite containing ions using the LTA zeolite; and preparing an iron type of LTA zeolite by performing iron (Fe) ion exchange on the ion-containing LTA zeolite.

The preparing of the Fe ion exchange on the ion-containing LTA zeolite may include adding the ion-containing LTA zeolite to an iron precursor solution and stirring the solution.

The preparing of the ion-containing LTA zeolite may include adding the LTA zeolite to an ammonium salt for reaction and then drying the LTA zeolite, wherein the ammonium salt may be ammonium nitrate ($NH_4NO_3$).

The performing of the Fe ion exchange on the ion-containing LTA zeolite may further include: mixing the ion-containing LTA zeolite with at least one of iron(III) nitrate nonahydrate ($Fe(NO_3)_3 \cdot 9H_2O$), sulfuric acid hydrate ($FeSO_4 \cdot 7H_2O$), iron(II) oxalate dihydrate ($FeC_2O_4 \cdot 2H_2O$), and iron(III) chloride tetrahydrate ($FeCl_2 \cdot 4H_2O$); and stirring the mixture.

The method for manufacturing the catalyst may further include thermally treating the Fe-type of LTA zeolite the performing of the Fe ion exchange on the ion-containing LTA zeolite, wherein the thermal treatment may be performed at a temperature ranging from 1 to 30° C./min from 400 to 750° C.

The preparing of the LTA zeolite having the Si/Al ratio of 2 or more may include preparing a LTA zeolite using an LTA seed or not using an LTA seed.

As described, according to the method for manufacturing the zeolite catalyst according to the exemplary embodiment, acidity is low and thus the high-temperature performance of the catalyst can be improved while reducing the consumption of urea.

DETAILED DESCRIPTION OF THE EMBODIMENTS

Figure 1:
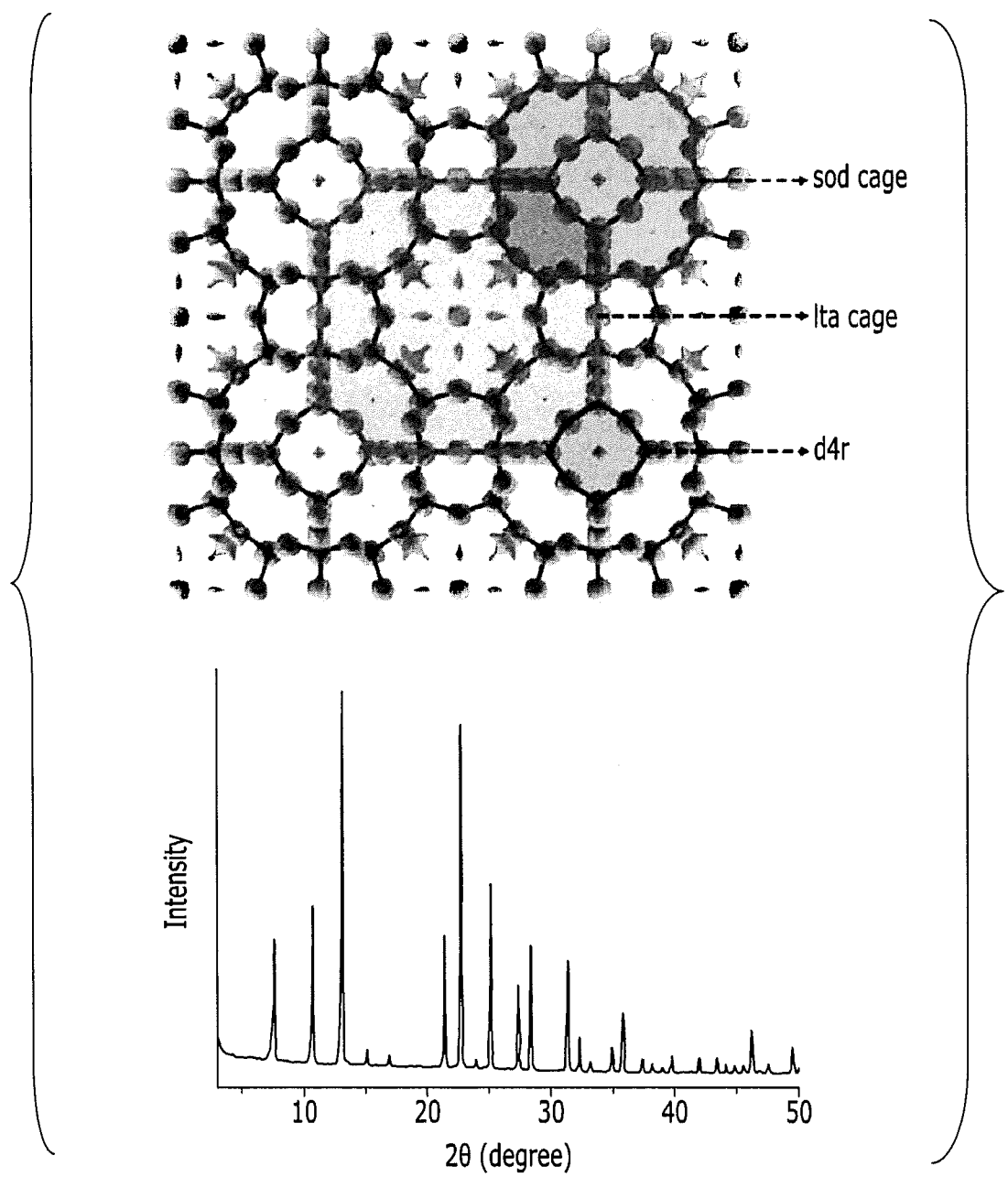
FIG. 1 illustrates a structure of an LTA zeolite according to an exemplary embodiment of the present disclosure.

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a method for manufacturing a catalyst according to an exemplary embodiment of the present disclosure will be described in detail. A catalyst manufactured in the present exemplary embodiment may be a zeolite catalyst.

A method for preparing zeolite for manufacturing the catalyst according to an exemplary embodiment of the present disclosure will be described.

First, LTA zeolite is prepared. In preparation of the LTA zeolite, a seed may or may not be used. A Si/Al ratio of the LTA zeolite prepared in the present stage may exceed 1. More specifically, the Si/Al ratio may be 2 to 50. Preferably, the Si/Al ratio may be 5 to 30. More preferably, the Si/Al ratio may be 8 or more.

As an example, a process for preparing the LTA zeolite using the seed will be described.

In order to prepare the LTA zeolite, an LTA seed is mixed in a mixture of aluminum hydroxide ($Al(OH)_3$) and tetraethyl orthosilicate ($Si(OC_2H_5)_4$).

Specifically, a 1,2-dimethyl-3-(4-methylbenzyl)imidazolium hydroxide aqueous solution and aluminum hydroxide ($Al(OH)_3$) are mixed and the mixture is primarily stirred, and then tetramethylammonium hydroxide pentahydrate is additionally mixed and then secondarily stirred so as to prepare a first mixture.

Here, with respect to the total weight of the first mixture, 20 to 35 wt % of 1,2-dimethyl-3-(4-methylbenzyl)imidazolium hydroxide, 1 to 2 wt % of aluminum hydroxide ($Al(OH)_3$), 1 to 5 wt % of tetramethylammonium hydroxide pentahydrate, and a residual quantity of water are mixed, and the primary stirring and the secondary stirring may be respectively performed for about 0.5 to 1.5 h.

Tetraethyl orthosilicate (TEOS) ($Si(OC_2H_5)_4$) is mixed into the first mixture and then third stirring is performed, and then the LTA seed is mixed and fourth stirring is performed so as to prepare a second mixture.

30 to 35 wt % of TEOS may be mixed with respect to the total weight of the second mixture, and the amount of LTA seed may be 2 to 6 wt % with respect to the total weight of the entire silicon included in the LTA zeolite.

In addition, the third stirring may be performed for about 2 to 4 h, and the fourth stirring may be performed for about 20 to 28 h.

Next, the second mixture is sufficiently heated to cause hydrolysis of the TEOS, and ethanol and water generated from the hydrolysis of TEOS are evaporated such that a third mixture is prepared.

The second mixture may be heated at a temperature between 70° C. and 90° C.

Next, a hydrofluoric aqueous solution is mixed in the third mixture, and a fourth mixture is prepared through heating, cleansing, and drying processes.

Here, the third mixture may be heated for a constant time period at a temperature of about 150° C. to 200° C., the cleansing process may be iteratively performed, and the drying process may be performed at room temperature.

Next, heat treatment is additionally performed to remove an organic material from the fourth mixture such that the LTA zeolite for manufacturing the zeolite catalyst according to an exemplary embodiment of the present disclosure is manufactured.

The heat treatment may be performed at a temperature between 500° C. and 700° C. for about 6 to 10 h, and a Si/Al ratio of the LTA zeolite may be 2 to 50 in the present exemplary embodiment.

When the LTA zeolite is prepared without using the seed, the LTA zeolite can be prepared as follows. As organic structure-inducing molecules, 0.0 mol to 0.2 mol of aluminum hydroxide and 0.0 mol to 0.2 mol of tetramethylammonium hydroxide (hereinafter referred to as TMAOH) are added in 0.1 mol to 1.0 mole of 1,2-dimethyl-3-(4-methylbenzyl)imidazolium hydroxide (hereinafter referred to as 12DM3 (4MB)IOH) in a plastic beaker and then sufficiently stirred. Next, tetraethyl orthosilicate (hereinafter referred to as TEOS) is added to the reactants in a proportion of 1 mol, and the mixture is sufficiently stirred.

Next, the solution is sufficiently heated at 60° C. to 100° C. until the amount of ethanol generated due to hydrolysis of TEOS added to the solution is completely removed, and at the same time the amount of water is 0 to 10 mol. Then, when 0.1 to 1.0 mol of hydrogen fluoride (HF) is added and sufficiently mixed, a reaction mixture having Chemical Formula 1 is obtained.

1 $SiO_2$:0.0-0.2 $Al(OH)_3$:0.0-0.2 TMAOH:0.1-1.0
R:0.1-1.0 HF:0-10 $H_2O$     [Chemical Formula 1]

wherein R denotes 12DM3 (4MB)IOH.

The reaction mixture is then moved to a Teflon reactor, and placed in a container that is made of stainless steel again and heated at 100° C. to 200° C. for 0.1 to 14 d to prepare the LTA zeolite. The LTA zeolite prepared by the above method may also have a Si/Al ratio of 2 to 50. However, the above-described manufacturing method is illustrative and is not limited to as above-described.

An XRD pattern of the LTA zeolite manufactured in the present stage is shown in the lower part of FIG. 1. A structure of the LTA zeolite manufactured in the present stage is shown in the upper part of FIG. 1.

Next, a step of preparing LTA zeolite containing ions using the manufactured LTA zeolite will be described in detail.

First, LTA zeolite is placed into an ammonium salt, refluxed, washed, and dried to manufacture an $NH_4$-type LTA zeolite containing $NH_4+$ ions.

Here, the ammonium salt may be ammonium nitrate ($NH_4NO_3$).

The reflux process can be carried out at a temperature of 60 to 100° C. for 5 to 7 h.

In the present embodiment, ammonium ions are exemplarily described as the ions, but the present disclosure is not limited thereto. That is, use of other ions and ion salts is also included within the scope of this disclosure.

Then, LTA zeolite including ions undergoes copper (Cu) ion exchange such that a Cu type of LTA zeolite including copper ions is prepared.

For the copper ion exchange, the LTA zeolite ions is injected into a copper precursor solution such as copper acetate monohydrate, copper nitride, copper nitrate, copper sulfate, and the like, and stirred, and then cleansing and drying processes are performed such that the Cu type of LTA zeolite can be prepared.

As a possible alternative, the LTA zeolite including ions may undergoes iron (Fe) ion exchange such that a Fe type of LTA zeolite including Fe ions can be prepared in another exemplary embodiment of the present disclosure.

The performing of the Fe ion exchange can be carried out by mixing the LTA zeolite including ions with at least one of iron(III) nitrate nonahydrate ($Fe(NO_3)_3 \cdot 9H_2O$), sulfuric acid hydrate ($FeSO_4 \cdot 7H_2O$), iron(II) oxalate dihydrate ($FeC_2O_4 \cdot 2H_2O$), and iron(III) chloride tetrahydrate ($FeCl_2 \cdot 4H_2O$) and stirring.

Next, the Cu type of LTA zeolite or the Fe type of LTE zeolite is heated in an oven with a gradually increasing temperature, and then a heat treatment process is performed such that the zeolite catalyst according to an exemplary embodiment of the present disclosure is manufactured.

Here, for the heat temperature of the Cu type of LTA zeolite or the Fe type of LTE zeolite, the temperature may be increased to 400 to 750° C. at a rate of 1 to 30° C./min, and then the heat treatment may be performed to about 1 to 24 h.

Hereinafter, experimental examples of the present disclosure will be described. However, the following experimental examples are only exemplaries, and the present disclosure is not limited to the following experimental examples.

Experimental Example: LTA Zeolite Catalyst Preparation

1 LTA Zeolite Preparation

In a plastic beaker, with respect to the total weight of an aqueous solution, 29.4 wt % (12.38 g) of 1,2-dimethyl-3-(4-methylbenzyl)imidazolium hydroxide aqueous solution and 0.1733 g of aluminum hydroxide were mixed and then stirred for about 1 h, and then tetramethylammonium hydroxide pentahydrate at 0.4152 g was additionally mixed therein and then stirred for about 1 h.

Next, tetraethyl orthosilicate (TEOS) at 6.80 g was mixed therein and then stirred for about 3 h, 4 wt % of LTA seed with respect to the entire silica injected thereto was added thereto and then stirred for about 24 h, and the mixture was heated at 80° C. to cause hydrolysis of the TEOS such that 5.90 g of ethanol and 5.37 g of water generated from the hydrolysis were evaporated.

Next, with respect to the total weight of the aqueous solution, 48 wt % (0.577 ml) of a hydrofluoric aqueous solution was mixed therein.

Then, the mixture to which the hydrofluoric aqueous solution was added was injected into a steel container and then heated at 175° C. for about 17 h while rotating the container at a speed of 60 rpm such that a solid product was generated, and the solid product was iteratively cleansed and then dried at room temperature.

In order to remove an organic material from the dried mixture, the dried mixture was heat-treated at 600° C. in a muffle furnace for about 8 h to thereby manufacture an LTA zeolite, XRD analysis was performed on the manufactured zeolite to determine that the zeolite had an LTA structure, and a Si/Al ratio was determined to be 16 through ICP analysis.

2. Zeolite Catalyst Preparation 2 g of the manufactured LTA zeolite and 100 ml of 1 M ammonium nitrate were mixed in a two-neck flask, and the mixture was refluxed at 80° C. for about 6 h.

Next, the mixture was iteratively cleansed with a filter and distilled water and then dried at room temperature, and the cleansing and drying processes were repeated two times such that an $NH_4$ type of LTA zeolite was manufactured.

The dried $NH_4$ type of LTA zeolite was injected into 100 ml of a 0.01 M copper acetate monohydrate ($Cu(OAc)_2 \cdot H_2O$) solution and then stirred at room temperature for about 6 h.

The dried $NH_4$ type of LTA zeolite was injected into 100 ml of a 0.01 M copper acetate monohydrate ($Cu(OAc)_2 \cdot H_2O$) solution and then stirred at room temperature for about 6 h.

Figure 2:
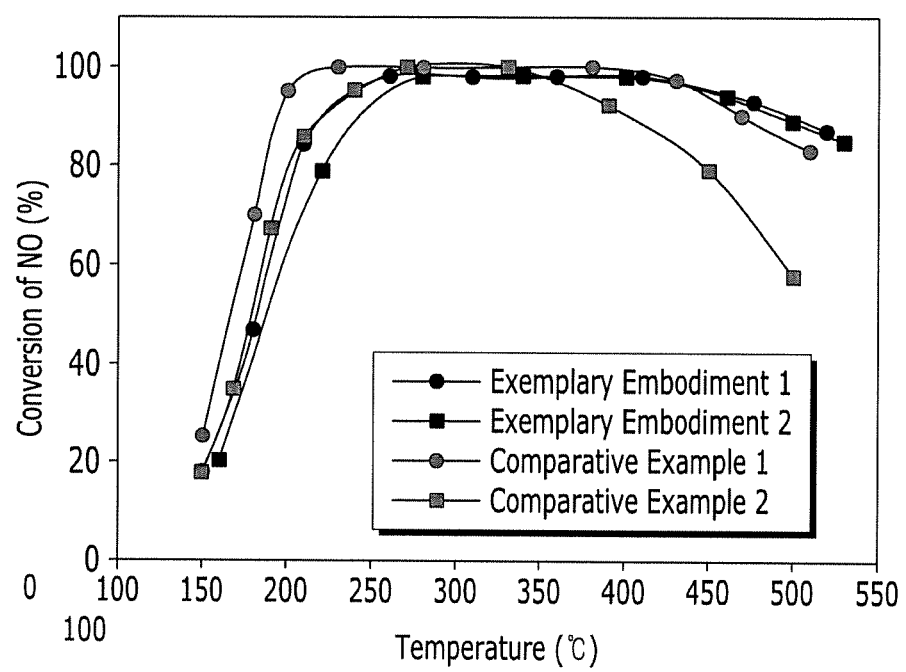
FIG. 2 is a graph illustrating a measurement result of removal of nitrogen oxide of a zeolite catalyst in various temperature ranges according to an exemplary embodiment of the present disclosure and a comparative example of the present disclosure.

In order to determine a removal rate of nitrogen oxide in the zeolite catalyst according to an exemplary embodiment of the present disclosure, an experiment was performed to measure a removal rate of the nitrogen oxide by temperature, and a result of the experiment is shown in FIG. 2.

FIG. 2 is a graph illustrating a result of an experiment performed to measure a removal rate of nitrogen oxide in the zeolite catalyst according to an exemplary embodiment of the present disclosure and in a zeolite catalyst according to a comparative example in various temperature ranges.

In FIG. 2, the horizontal axis denotes a temperature (° C.) and the horizontal axis denotes a removal rate (%) of nitrogen oxide.

As the zeolite catalyst according to a comparative example, Cu/SSZ-13 (Si/Al=13) was used.

In order to determine high-temperature performance of the zeolite catalyst according to an exemplary embodiment of the present disclosure, two zeolite catalysts, one with no treatment (Exemplary Embodiment 1) and the other one having undergone heat treatment at 750° C. for about 24 h with air containing 10% humidity (Exemplary Example 2), were respectively used in experiments.

In addition, in order to determine high-temperature performance of Cu/SSZ-13, two catalysts, one with no treatment (Comparative Example 1) and the other one having undergone heat treatment at 750° C. for about 24 h with air containing 10% humidity (Comparative Example 2), were respectively used in experiments.

In order to determine a removal rate by temperature, the zeolite catalysts of the exemplary embodiments and the comparative examples were supplied with 500 ppm of nitride oxide (NO), 500 ppm of ammonia ($NH_3$), 5% of oxygen, and humidity of 10% at a gas hourly space velocity (GHSV) of nitrogen ($N_2$) of 100,000, and a removal rate of nitrogen oxide was measured while changing the temperature between 150° C. and 550° C.

First, referring to FIG. 2, the nitrogen oxide removal rate of Exemplary Embodiment 1 is similar to that of Comparative Example 1 until the temperature reaches 400° C., but when the temperature exceeds 400° C., the nitrogen oxide removal rate of Exemplary Embodiment 1 is excellent compared to Comparative Example 1.

In addition, in Exemplary Embodiment 2, the nitrogen oxide removal rate was about 30% better than Comparative Example 2 from a zone where the temperature exceeds 300° C.

Hereinafter, a catalyst according to an exemplary embodiment will be described. A catalyst according to the present exemplary embodiment includes LTA zeolite that contains copper ions, and a Si/Al ratio of the LTA zeolite may be 2 to 50. The catalyst may be coated on a honeycomb carrier or a filter.

In the catalyst according to the present exemplary embodiment, a Si/Al ratio of the LTA zeolite may be 2 to 50. When the Si/Al ratio is less than 2, the hydrothermal stability may be poor, and when the Si/Al ratio is 50 or more, there may be a problem of low performance because there are few aluminum sites that may contain Cu or Fe.

The catalyst can be manufactured by a manufacturing method according to the present exemplary embodiment. The catalyst can remove NOx from a reaction gas at a temperature of 100° C. or more.

In addition, as shown in FIG. 1, the catalyst according to the present exemplary embodiment may have a NOx conversion ratio of above 80% at a temperature above 450° C.

In the catalyst, a copper/aluminum ratio may be 0.1 to 0.6. Alternatively, an amount of copper in the catalyst may be 1 wt % to 5 wt %. When the copper content is set to 2 wt % in a catalyst having a Si/Al ratio of 23, even when hydrothermal aging is performed at a high temperature of 900° C. or more for 24 h, excellent NOx purification efficiency is exhibited. In the present disclosure, the term hydrothermal means a process to send a flow of air of relative humidity 10% at a predetermined temperature and time.

In addition, in the exemplary embodiment, the catalyst may further include an additive. The additive may include an alkali metal or an alkaline earth metal. Alternatively, the additive may be selected from a group consisting of La, Ce, Zr, Sc, and In, and in this case, catalyst performance at low temperatures can be improved.

When the additive is an alkali metal or alkaline earth metal, the ratio of additive/aluminum may range from 0.1 to 0.3. When the additive is one or more selected from the group consisting of La, Ce, Zr, Sc, and In, the ratio of additive/aluminum may range from 0.01 to 0.05.

In addition, the catalyst according to an embodiment of the present disclosure may be a mixture of copper-type LTA zeolite and copper-type SSZ-132 zeolite. In this case, a mixing ratio of the copper-type LTA zeolite to the copper-type SSZ-13 zeolite may be 1:3 to 3:1. The mixing ratio of the copper-type LTA zeolite to the copper-type SSZ-13 zeolite may be 1:1. When the copper type LTA zeolite and the copper type SSZ-13 are mixed and used, a NOx purification rate at a low temperature can be improved.

As described above, the LTA zeolite catalyst according to the present disclosure has a Si/Al ratio of 2 to 50. Depending on a freshness state or a hydrothermal aging temperature and time, the Si/Al ratio that indicates optimum performance may be varied.

The effect of the LTA zeolite catalyst according to the various exemplary embodiments of the present disclosure will now be described with reference to the following experimental examples.

Experimental Example 2: Measurement of NOx Conversion Rate

Figure 3A:
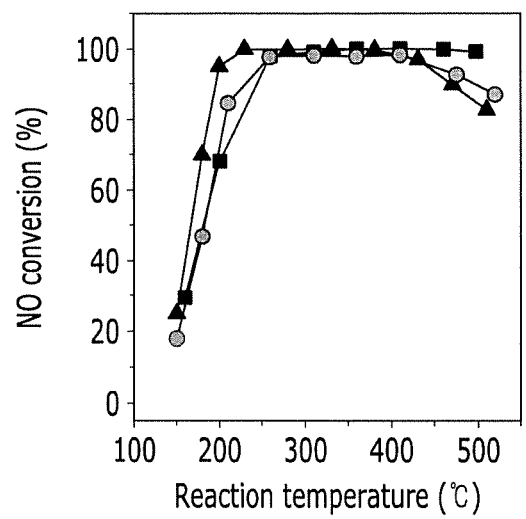
FIG. 3A is a measurement result of an NOx conversion ratio in a fresh state.
Figure 3B:
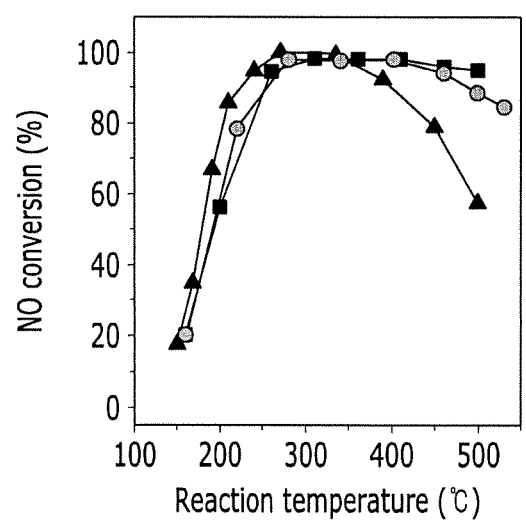
FIG. 3B is a measurement result of the NOx conversion ratio after performing hydro-thermal aging at 75° C.

NOx conversion rates of copper-type LTA zeolite (■) having a Si/Al ratio of 11, copper-type LTA zeolite (●) having a Si/Al ratio of 16, and copper-type SSZ-13 zeolite (▲) having a Si/Al ratio of 16 according to temperature were respectively measured, and the measurement results are shown in FIG. 3. FIG. 3(*a*) shows a measurement result of the NOx conversion rate in a fresh state, and FIG. 3 shows a measurement result of the NOx conversion rate after performing hydrothermal aging at 750° C.

In this case, the conversion rate was measured under the same conditions as Experimental Example 1. That is, the catalyst was supplied with 500 ppm of nitride oxide (NO), 500 ppm of ammonia ($NH_3$), 5% of oxygen, and humidity of 10% at a gas hourly space velocity (GHSV) of nitrogen ($N_2$) of 100,000, and a removal rate of nitrogen oxide was measured while changing the temperature between 150° C. and 550° C. This is the same in other experimental examples below.

Referring to FIGS. 3(*a*) and (*b*), the LTA catalyst according to the present disclosure had an excellent NOx conversion rate before hydrothermal aging, and the NOx conversion rate was remarkably improved even at a high temperature after hydrothermal aging at 750° C.

Experimental Example 3: LTA Zeolite Catalyst Having Copper Content of 2 wt % and Si/Al Ratio of 23

Figure 4:
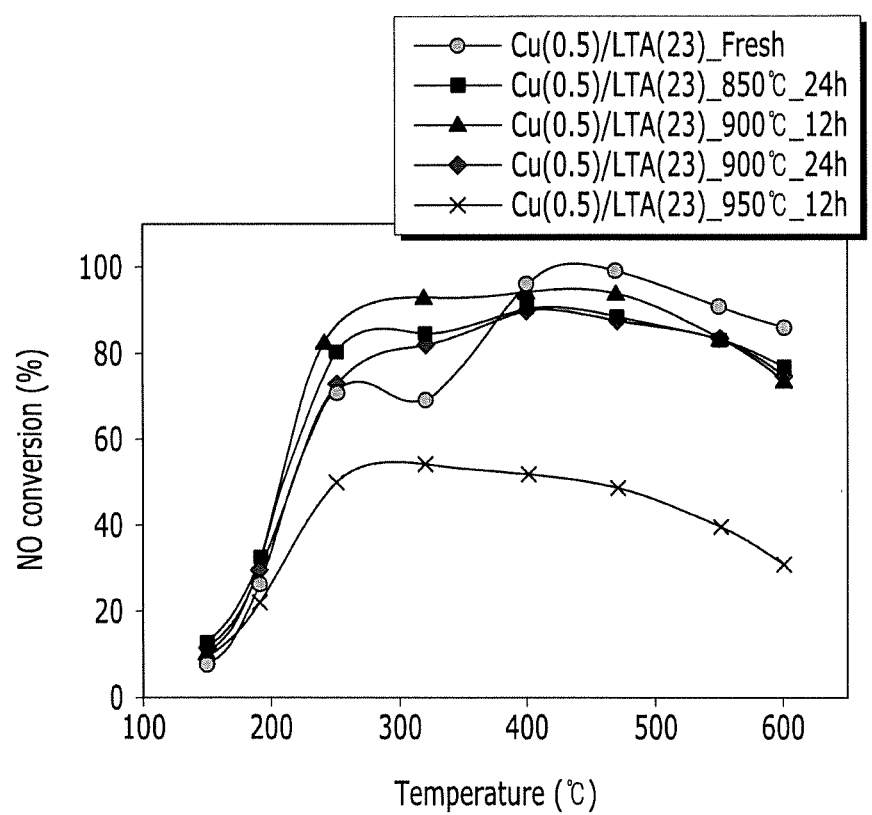
FIG. 4 shows a NOx conversion ratio of a catalyst according to Experimental Example 3.

In LTA zeolite having a Si/Al ratio of 23, manufactured according to the present disclosure, a copper content in copper ion exchange was set to 2 wt %. With respect to such a catalyst, hydrothermal aging was carried out at various temperature and time conditions, and NOx conversion performance was measured and measurement results are shown in FIG. 4. Referring to FIG. 4, it was determined that even when hydrothermal aging was performed for 24 h at 900° C., excellent NOx conversion performance was maintained at 50% or more.

Experimental Example 4: Catalyst Including Additive

Figure 5:
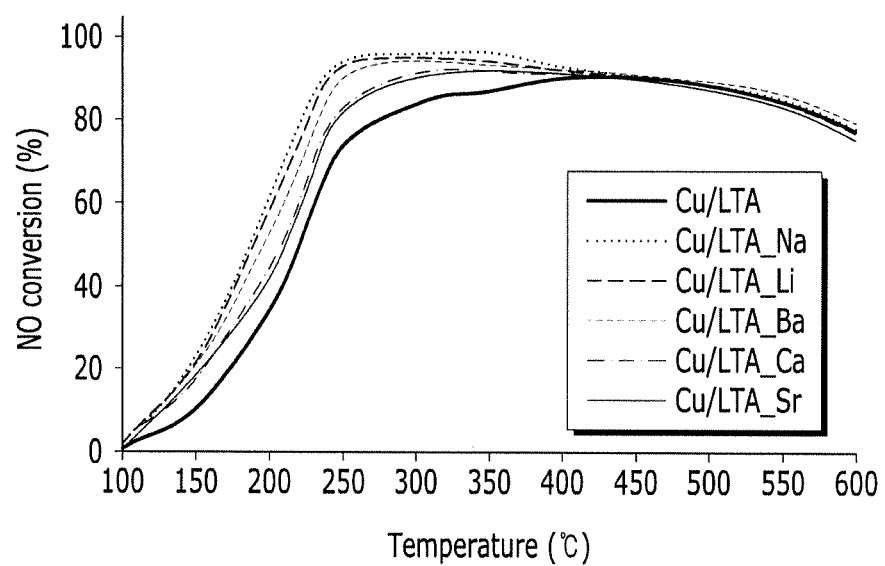
FIG. 5 to FIG. 7 show a NOx conversion ratio of a catalyst according to Experimental Example 4.
Figure 6:
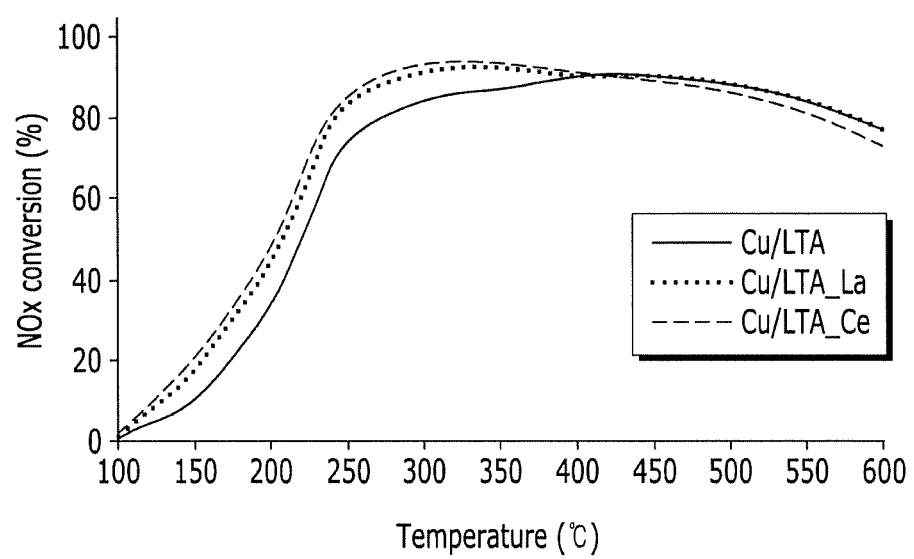
Figure 7:
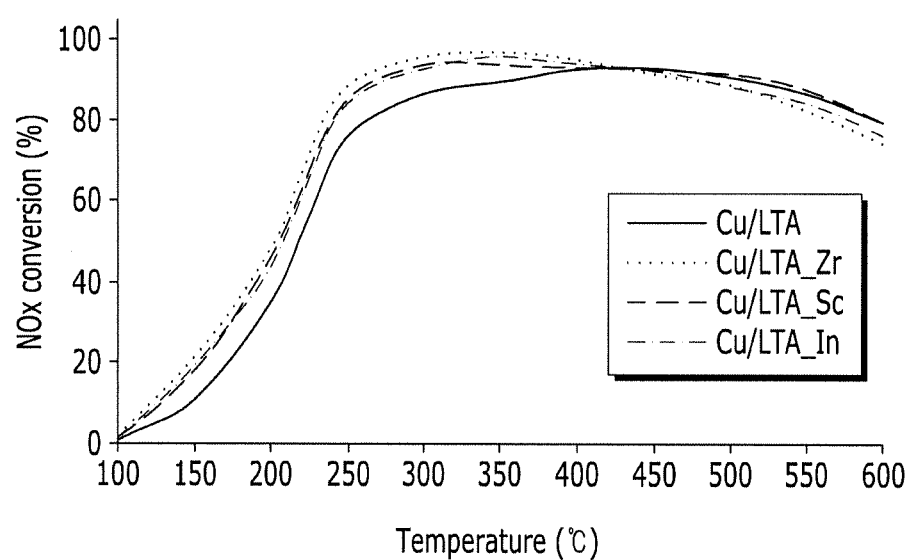

In LTA zeolite having a Si/Al ratio of 16, manufactured according to the present disclosure, NOx conversion rates were measured while various additives were added, and measurement results are shown in FIG. 5 to FIG. 7. FIG. 5 shows a result of adding an alkali metal or an alkaline earth metal as an additive, FIG. 6 shows a result of adding a La-based metal as an additive, and FIG. 7 shows a result of adding Zr, Sc, and In as an additive. Referring to FIG. 5 to FIG. 7, it was determined that, when various additives are added, NOx conversion performance at a low temperature was improved without significantly affecting the NOx conversion performed at a high temperature.

Experimental Example 5: Mixed with Cooper-Type of SSZ-13 Zeolite

Figure 8:
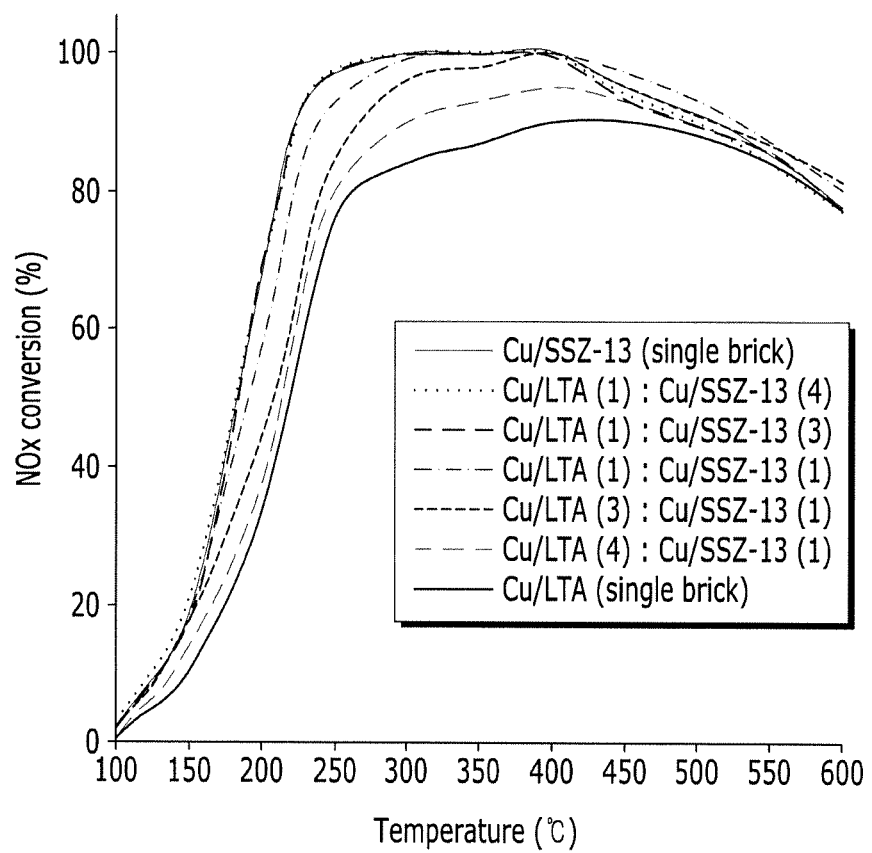
FIG. 8 and FIG. 9 show a NOx conversion ratio of a catalyst according to Experimental Example 5.
Figure 9:
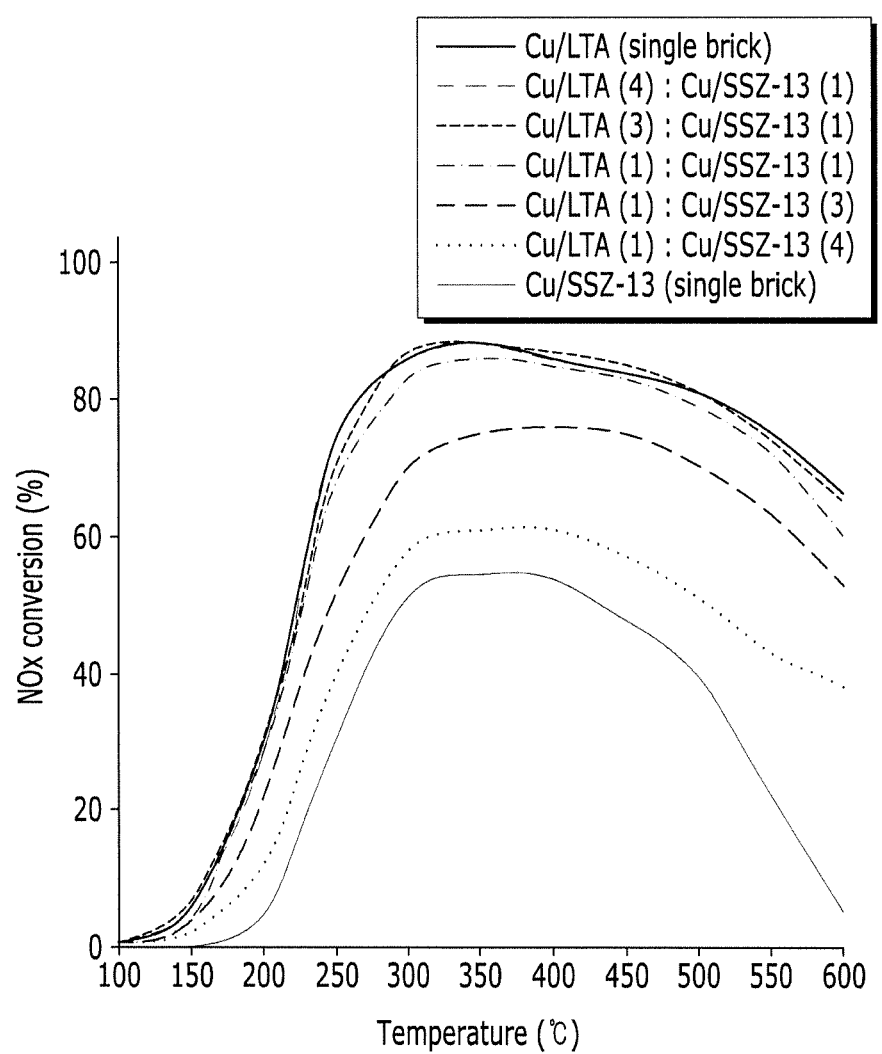

A catalyst was prepared by varying a mixing ratio of the LTA zeolite having a Si/Al ratio of 16, manufactured according to the present disclosure and a copper-type SSZ-13 zeolite, and NOx conversion performance according to temperature was measured and measurement results are shown in FIG. 8 and FIG. 9. FIG. 8 shows a measurement result of NOx conversion performance in a fresh state, and FIG. 9 shows a measurement result of NOx conversion performance after hydrothermal aging at 900° C. for 12 h.

Referring to FIG. 8 and FIG. 9, performance was excellent as the content of copper-type of SSZ-13 zeolite was high in the case of the fresh catalyst, and performance was excellent as the content of the copper-type of zeolite was high. When all the results shown in FIG. 8 and FIG. 9 are taken into account, it can be determined that the performance was excellent in the case where the mixing ratio of copper-type LTA zeolite to copper-type SSZ-13 zeolite was 1:1 to 3:1.

Experimental Example 6: Experiment with Different Si/a Ratios

Figure 10:
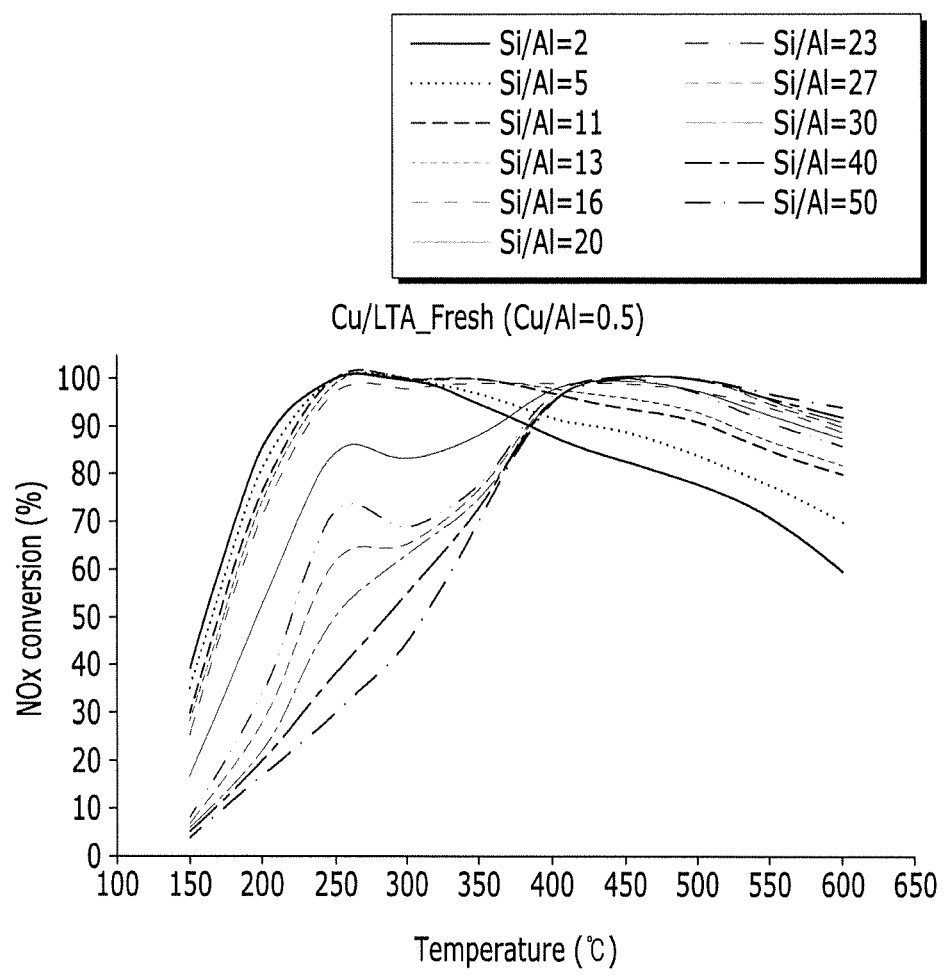
FIG. 10 to FIG. 13 show a NOx conversion ratio of a catalyst according to Experimental Example 6.
Figure 11:
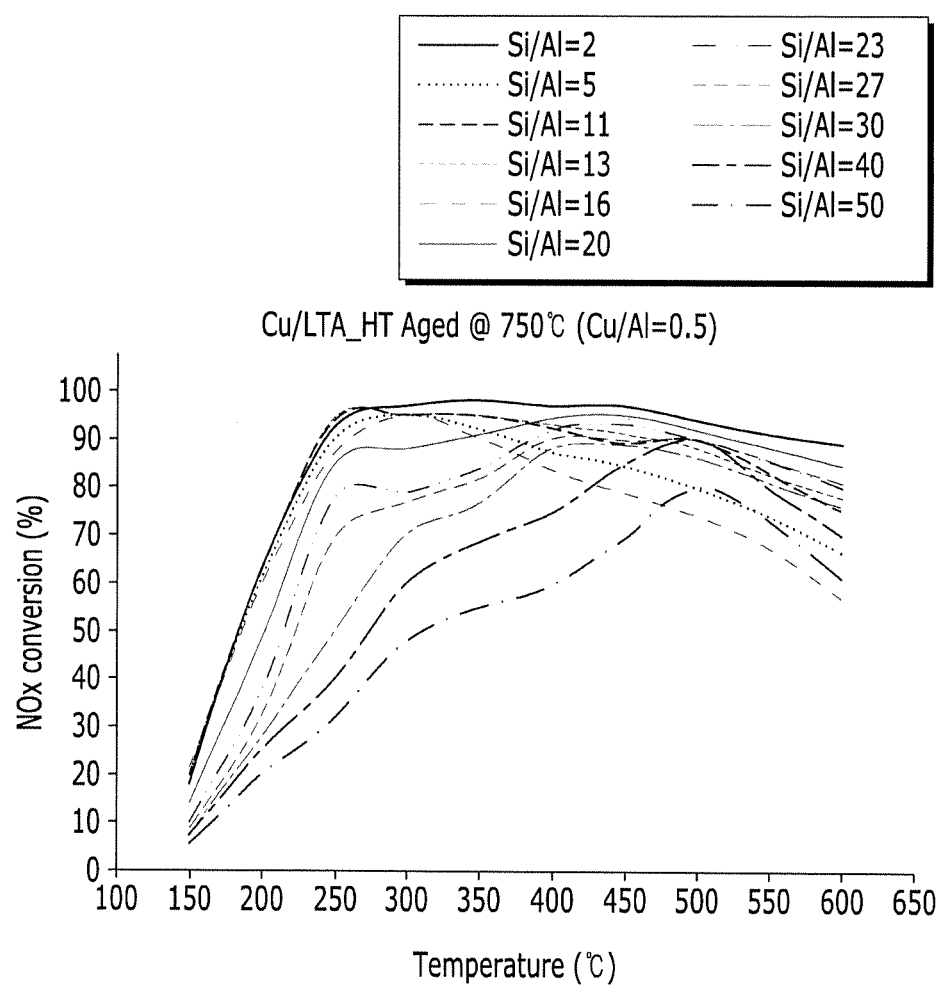
Figure 12:
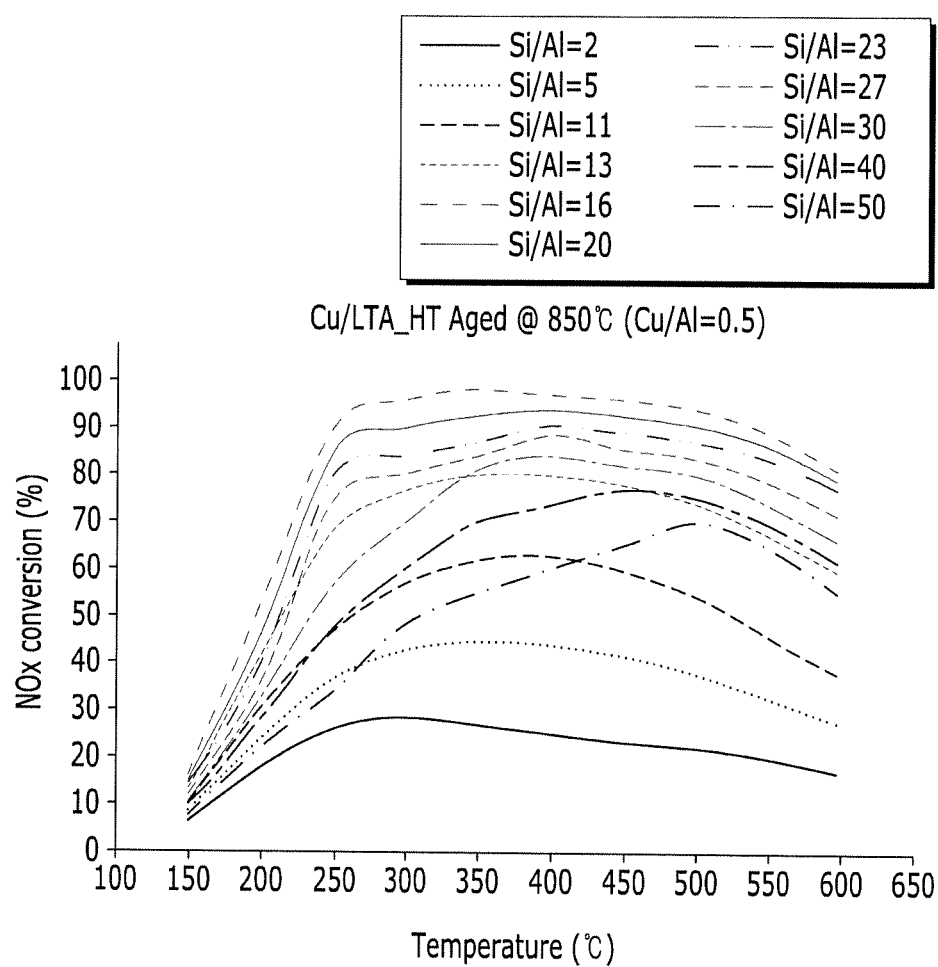
Figure 13:
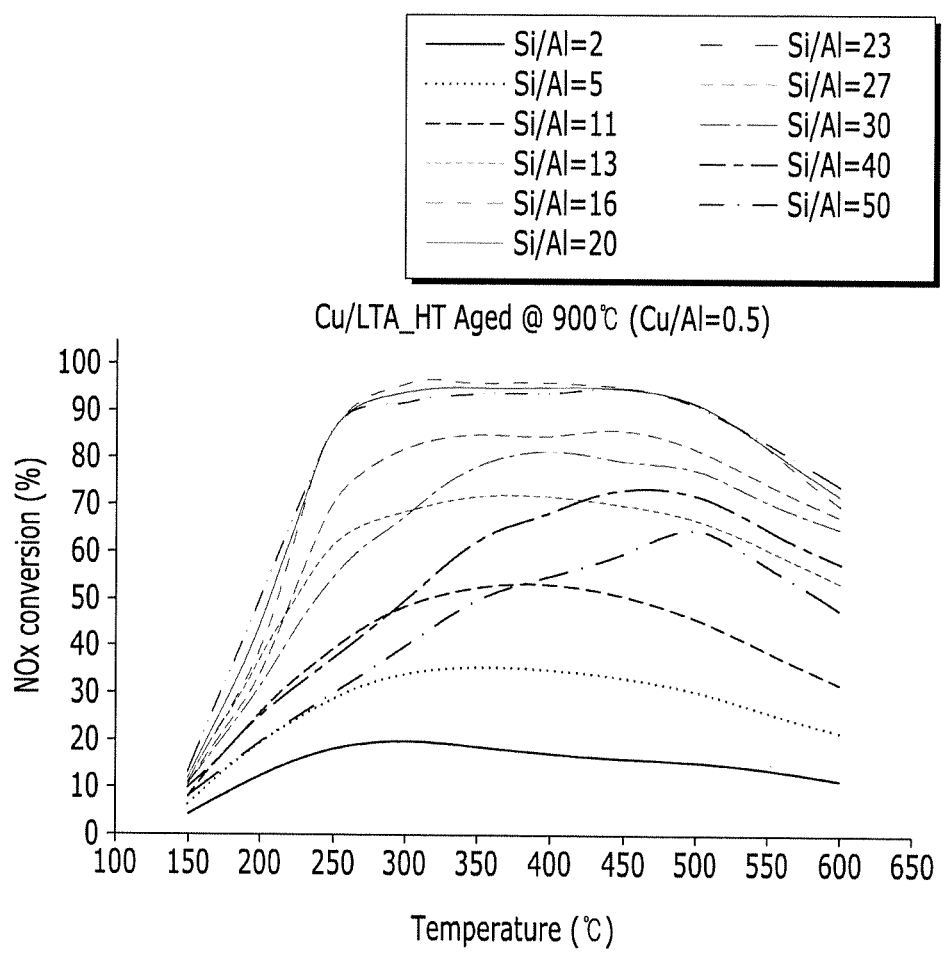

A NOx conversion rate according to temperature was measured by varying a Si/Al ratio of the LTA zeolite catalyst according to the present disclosure. The NOx conversion was measured by varying the aging temperature of the catalyst in a fresh state, to 750° C., 850° C., and 900° C., respectively, and measurement results are shown in FIGS. 10 to 13. FIG. 10 shows performance at the fresh state, FIG. 11 shows performance at the state of aging at 750° C., FIG. 12 shows performance at the state of aging at 850° C., and FIG. 13 shows performance at 900° C. In FIG. 10 to FIG. 13, a content of copper was set to make a Cu/Al ratio become 0.5.

Referring to FIG. 10 to FIG. 13, it could be determined that the ratio of Si/Al, which shows optimum activity depending on aging temperature, was different for each catalyst. Therefore, a person skilled in the art can appropriately use the Si/Al ratio optimum for the conditions of use of the catalyst.

Experimental Example 7: Experiment with Different Si/Al Ratios

Figure 14:
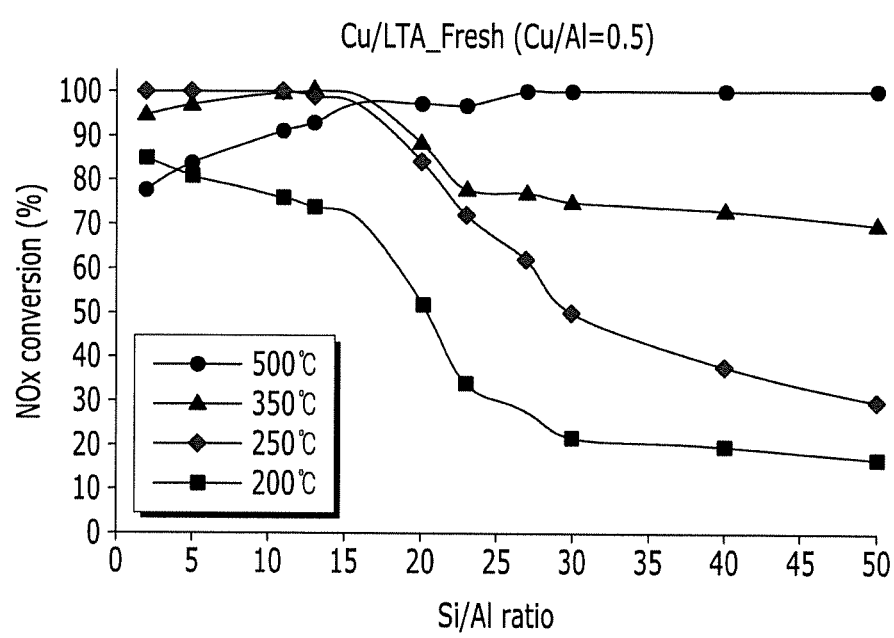
FIG. 14 to FIG. 17 show a NOx conversion ratio of a catalyst according to Experimental Example 7.
Figure 15:
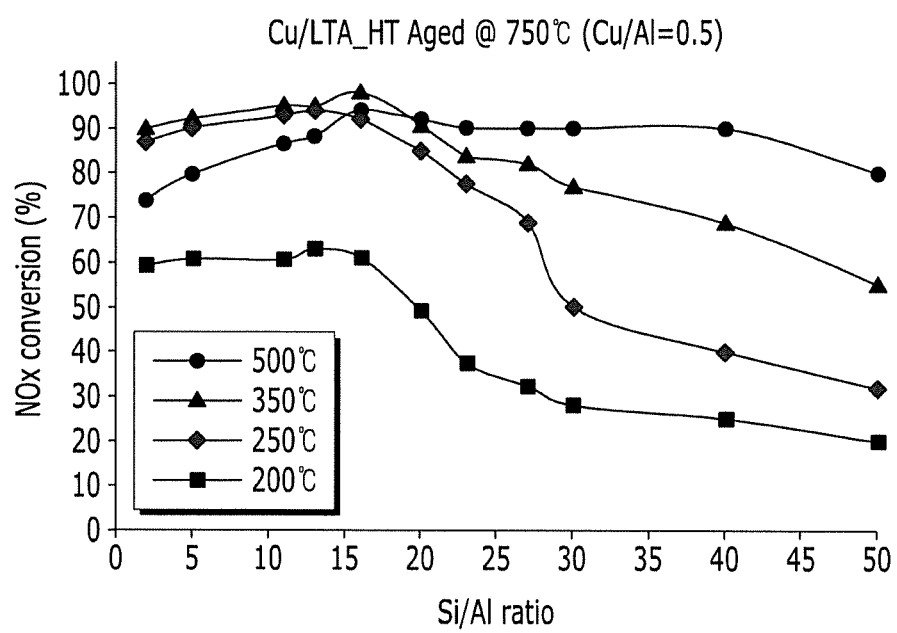
Figure 16:
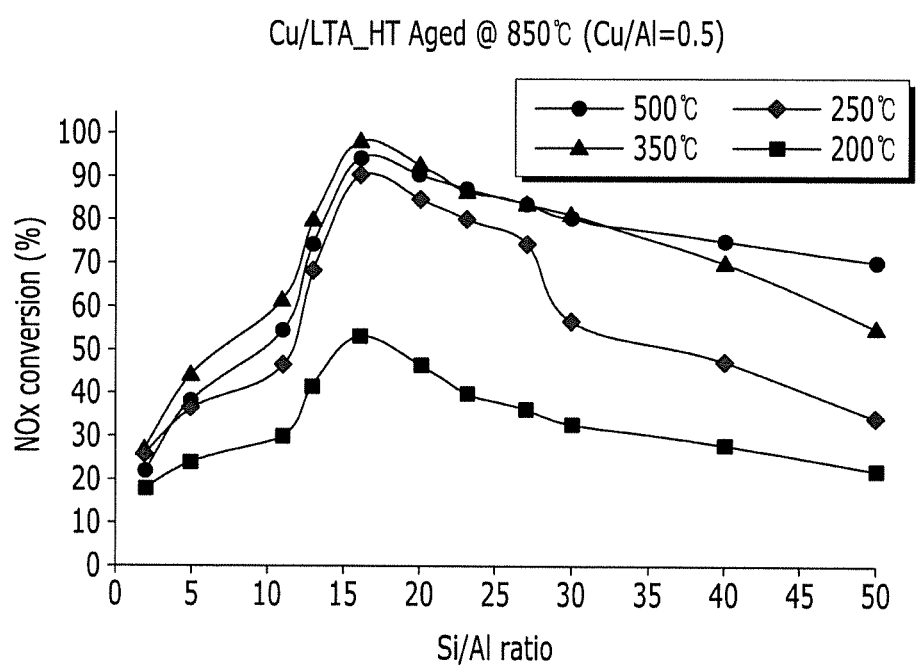
Figure 17:
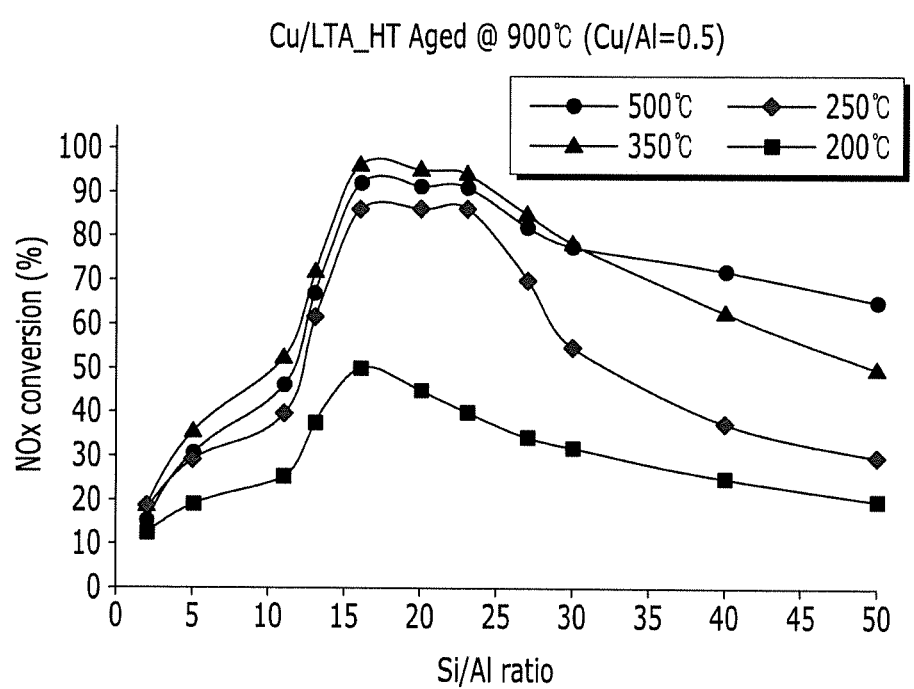

The experiment was performed using a method that is similar to Experimental Example 6, except that a reaction temperature was consistent, and NOx conversion rates according to a Si/Al ratio of a catalyst are shown in FIG. 14 to FIG. 17. FIG. 14 shows performance at a fresh state, FIG. 15 shows performance in a state of aging at 750° C., FIG. 16 shows performance in a state of aging at 850° C., and FIG. 17 shows performance in a state of aging at 900° C.

As a result, the performance was excellent when the Si/Al ratio was low at a low temperature in the case of the fresh catalyst, but the performance was excellent when the Si/Al ratio was high at a high temperature.

In addition, referring to FIG. 15 to FIG. 17, in the aging state, the performance was excellent when the Si/Al ratio was 10 to 30.

Figure 18:
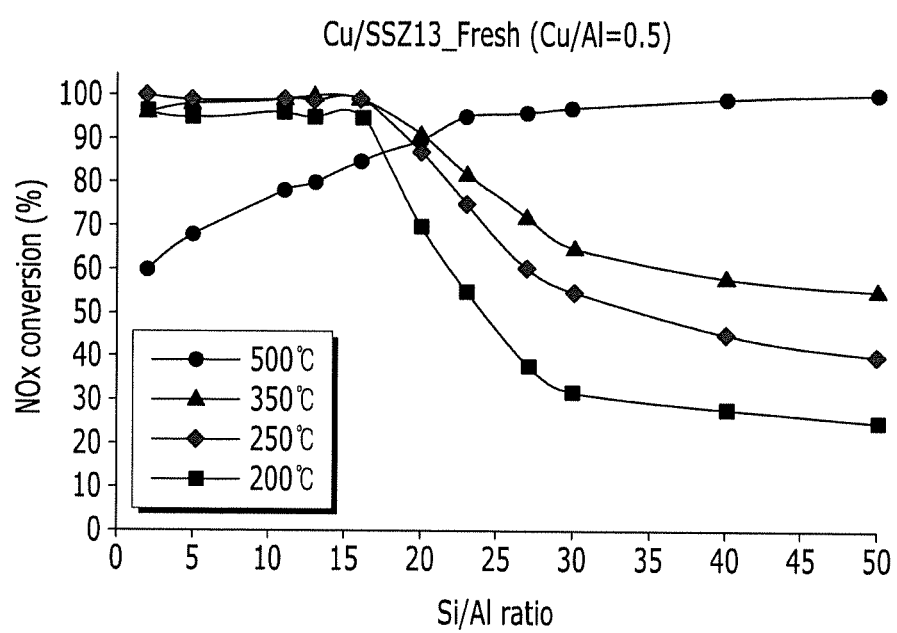
FIG. 18 to FIG. 21 show a NOx conversion ratio of a catalyst according to Comparative Example 1.
Figure 19:
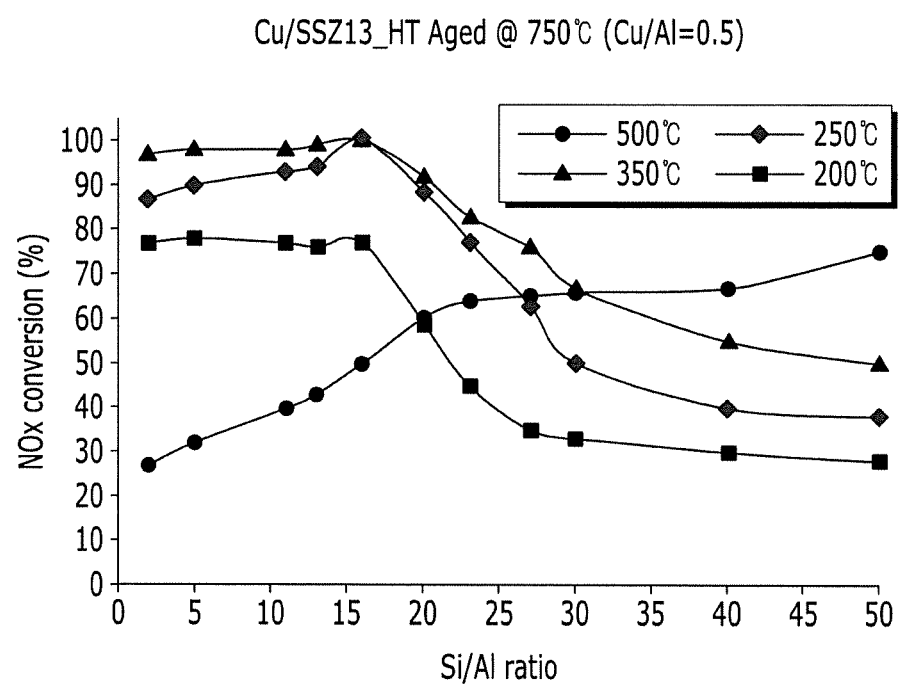
Figure 20:
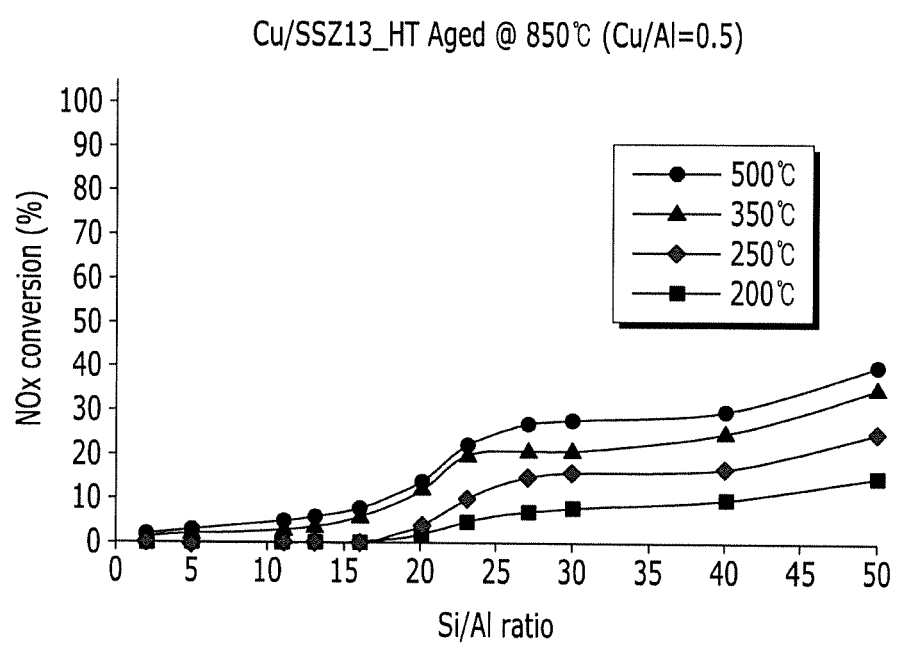
Figure 21:
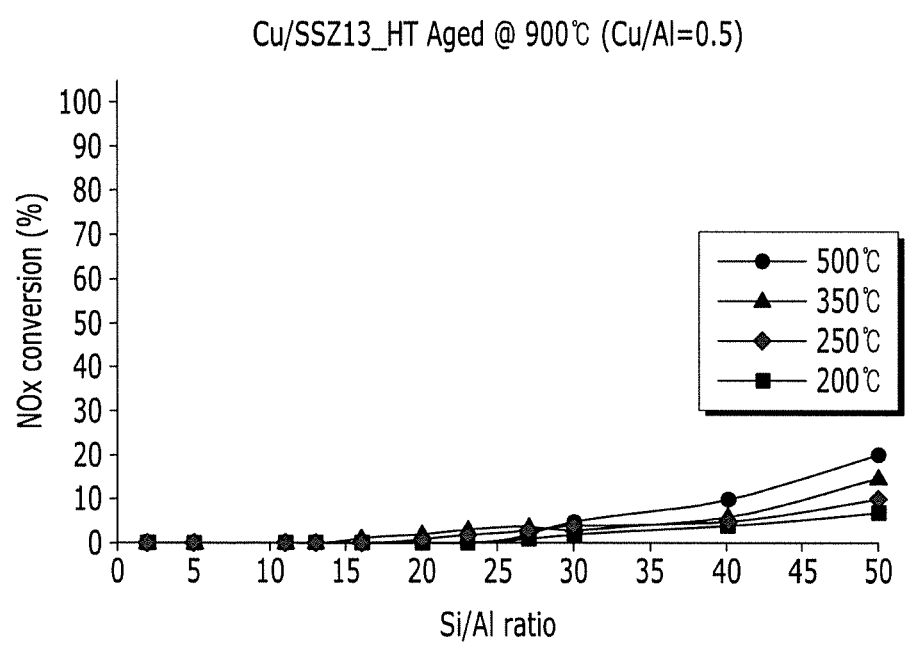

Comparative Example 1: Experiment with Different Si/Al Ratios with Respect to Cu-type of SSZ-13 Catalyst Comparative Example 1 is similar to Experimental Example 7, except that rather than the LTA zeolite of the present disclosure, SSZ-13 zeolite was used, and NOx conversion rates according to Si/Al ratios at each temperature were measured and measurement results are shown in FIG. 18 to FIG. 21. FIG. 18 shows performance in a fresh state, FIG. 19 shows performance in a state of aging at 750° C., FIG. 20 shows performance in a state of aging at 850° C., and FIG. 21 shows performance in a state of aging at 900° C.

In comparison between the measurement results of Comparative Example 1 shown in FIG. 18 to FIG. 21 and the measurement results of Experimental Example 7 shown in FIG. 14 to FIG. 17, the result of Comparative Example 1 shows that high-temperature performance at 500° C. was relatively low compared to that of the LTA zeolite according to the present disclosure. In addition, in comparison with the results of Comparative Example 1, shown in FIG. 20 and FIG. 21 and the results of Exemplary Embodiment 7 shown in FIG. 16 and FIG. 17, performance was significantly different after aging at 850° C. or above. That is, compared to the SSZ-13 catalyst, the LTA zeolite catalyst according to the exemplary embodiment of the present disclosure shows a remarkably improved effect even when the Si/Al ratio is the same as that of the SSZ-13 catalyst.

In addition, a catalyst according to another exemplary embodiment includes LTA zeolite that contains Fe ions, and a Si/Al ratio of the LTA zeolite may be 2 to 50. The catalyst may be coated on a honeycomb carrier or a filter, and the catalyst can remove NOx from a reaction gas at 100° C. or above. The catalyst may include ions at a content of 1 wt % to 5 wt %.

Experimental Example 8: LTA Zeolite Catalyst Containing Fe

LTA zeolite having a Si/Al ratio of 16 according to the present disclosure was prepared. In this case, Fe ions were added to the LTA zeolite such that an Fe-type of LTA zeolite having an Fe/Al ratio of 0.2 was prepared. In addition, as a comparative example, SSZ-13 zeolite containing Fe ions was prepared.

Figure 22:
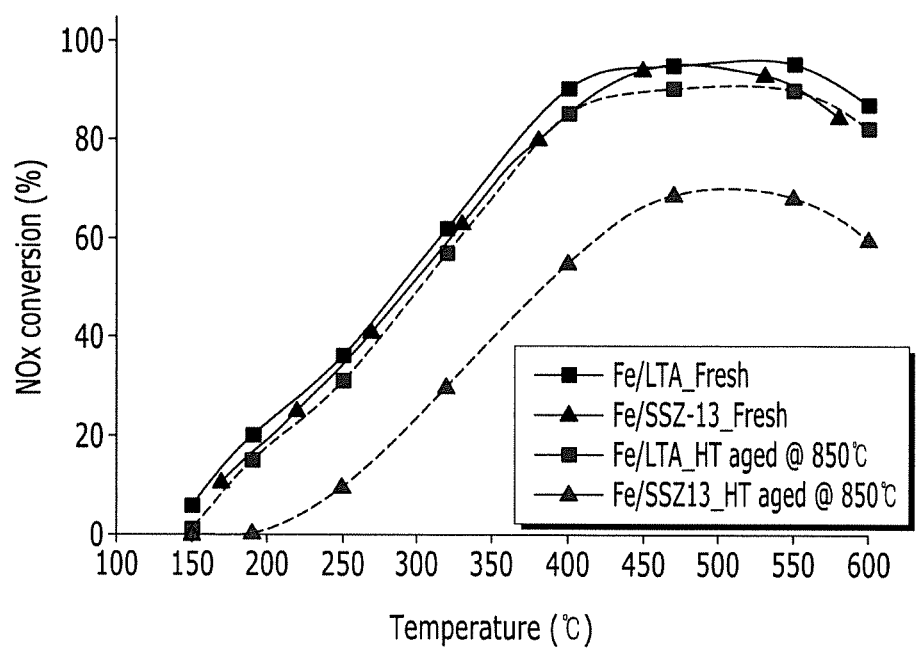
FIG. 22 shows a NOx conversion ratio of a catalyst according to Comparative Example 1.

With respect to the Fe-type of LTA zeolite catalyst (exemplary embodiment) and the Fe-type of SSZ-13 zeolite catalyst, NOx conversion rates with respect to each temperature were measured and measurement results are shown in FIG. 22. The conversion rate of each catalyst in a fresh state and the conversion rate after hydrothermal aging at 850° C. were measured.

Referring to FIG. 22, it could be determined that the Fe-type of LTA zeolite catalyst according to the present disclosure has remarkably improved performance after hydrothermal aging at 850° C. compared to the Fe-type of SSZ-13 zeolite catalyst.

Hereinafter, an example of application of the zeolite catalyst manufactured according to the method for manufacturing the zeolite catalyst according to an exemplary embodiment of the present disclosure will be described with reference to FIG. 23.

Figure 23:
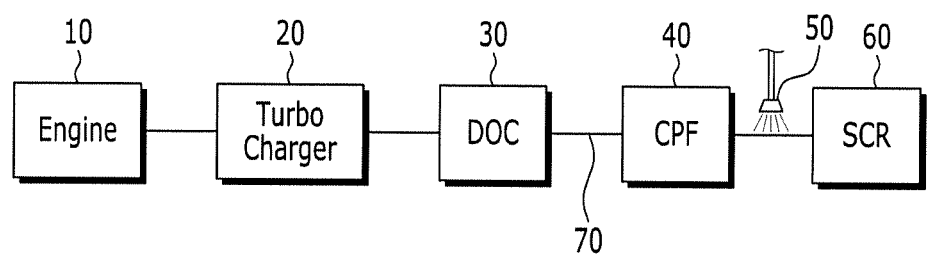
FIG. 23 is a block diagram of an exhaust gas purification device that employs the zeolite catalyst according to an exemplary embodiment of the present disclosure.

FIG. 23 is a block diagram of an exhaust gas purification device to which the zeolite catalyst according to an exemplary embodiment of the present disclosure is applied.

As shown in FIG. 23, an exhaust gas generated from an engine 10 sequentially passes a turbocharger 20, a diesel oxidation catalyst (DOC) device 30, a catalyzed particulate filter (CPF) 40, a spray nozzle 50, and a selective catalytic reduction (SCR) device 60 such that harmful materials in the exhaust gas are removed. Here, the turbocharger 20, the DOC device 30, the CPF 40, the spray nozzle 50, and the SCR device 60 may be installed in an exhaust pipe 70.

The engine 10 includes a plurality of cylinders (not shown) for combustion of an air mixture. The cylinder is connected with an intake manifold (not shown) to receive the air mixture, and the intake manifold is connected with an intake pipe (not shown) to receive external air.

Further, the cylinder is connected with an exhaust manifold (not shown) such that exhaust gas generated during a combustion process is collected in the exhaust manifold. The exhaust manifold is connected with the exhaust pipe 70.

The turbocharger 20 rotates a turbine (not shown) using energy of the exhaust gas so as to increase the air intake amount.

The DOC device 30 may be provided in a rear end of the turbocharger 20. In the DOC device 30, HC and CO are oxidized and NO is oxidized to $NO_2$. In addition, in order to effectively generate $NO_2$, at least one of the zeolite catalyst, which has ion-exchanged with a transition metal and is manufactured according to the above-described method of the present disclosure and a noble metal may be included in the DOC device 30, and the zeolite catalyst manufactured according to the above-described method of the present disclosure may be used as a supporter of a cold start catalyst (CSC) that intercalates NOx generated at initial cold-starting in the DOC device 30.

The CPF 40 is provided in a rear end of the DOC device 30, and includes a catalyst filter CPF.

The CPF 40 collects particulate matter (PM) in the exhaust gas and regenerates the collected PM (i.e., soot). The regeneration of soot is performed when a pressure difference between an inlet and an outlet of the CPF 40 is higher than a predetermined pressure.

The spray nozzle 50 is provided between the CPF 40 and the SCR device 60, and sprays a reducing agent to exhaust oxidized in the DOC device 30 and the CPF 40. The reducing agent may be ammonia, and generally urea is sprayed from the spray nozzle 50 and the sprayed urea is decomposed to ammonia.

The exhaust gas mixed with the reducing agent and $NO_2$ generated from the DPC device 30 is supplied to the SCR device 60.

The SCR device 60 is provided in a rear end of the spray nozzle 50, and includes the zeolite catalyst ion-exchanged with the transition metal, manufactured according to the above-described method of the present disclosure. The LTA zeolite catalysts according to various exemplary embodiments described above may be included in the SCR device 60. A detailed description of the same components will be omitted. The SCR device 60 reduces NO in the exhaust gas to nitrogen gas $N_2$ using $NO_2$ generated from the DOC device 30 and the reducing agent such that $NO_x$ in the exhaust gas can be reduced.

Further, the Cu type of LTA zeolite catalyst according to the exemplary embodiment of the present disclosure, which can be applied to the DOC device 30 and the SCR device 60, may be solely used or mixed with a Cu type of SSZ-13 catalyst. When the Cu type of SSZ-13 catalyst and the Cu type of LTA zeolite catalyst according to the exemplary embodiment of the present disclosure are mixed, low-temperature performance and high-temperature performance can be more improved.

As described, according to the method for manufacturing the zeolite catalyst according to the exemplary embodiment of the present disclosure, acidity is low and thus the high-temperature performance of the catalyst can be improved while reducing the consumption of urea.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A catalyst comprising linde type A (LTA) zeolite ion-exchanged by copper ions and a copper type of SSZ-13 zeolite,
   wherein a silicon/aluminum (Si/Al) ratio of the LTA zeolite is 3 to 25, and
   wherein a mixing ratio of the LTA zeolite to the copper-type SSZ-13 zeolite is 1:3 to 3:1.

2. The catalyst of claim 1, wherein the catalyst is coated on a honeycomb carrier or a filter.

3. The catalyst of claim 1, wherein a content of copper in the catalyst is 1 wt % to 5 wt %.

4. The catalyst of claim 1, comprising a substance which is selected from the group consisting of an alkali metal and an alkali earth metal,
   wherein a ratio of the substance to aluminum is 0.1 to 0.3.

5. The catalyst of claim 1, further comprising a substance which is selected from the group consisting of La, Ce, Zr, Sc, and In,
   wherein a ratio of the substance to aluminum is 0.01 to 0.05.

* * * * *